Patented Mar. 21, 1933

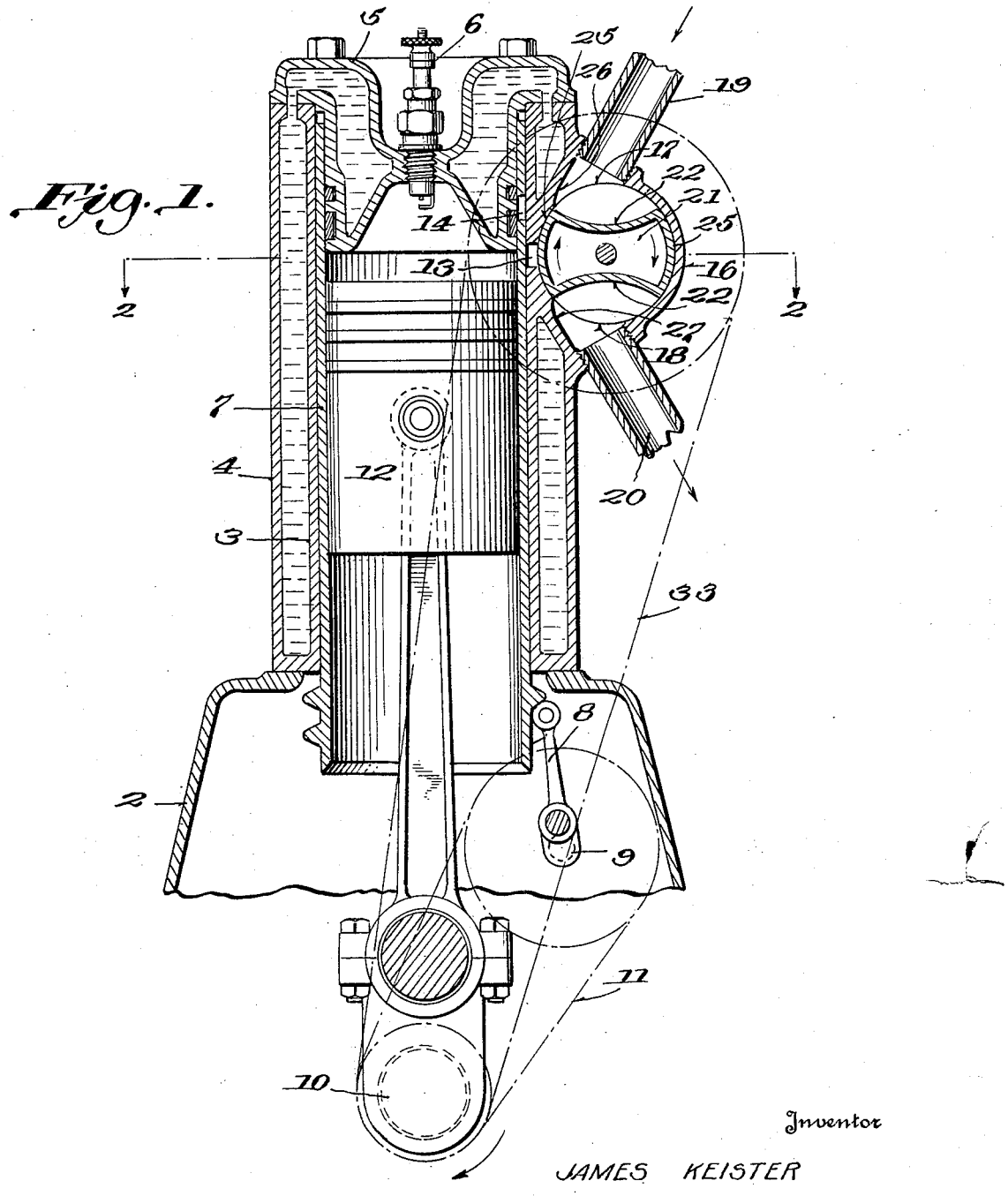

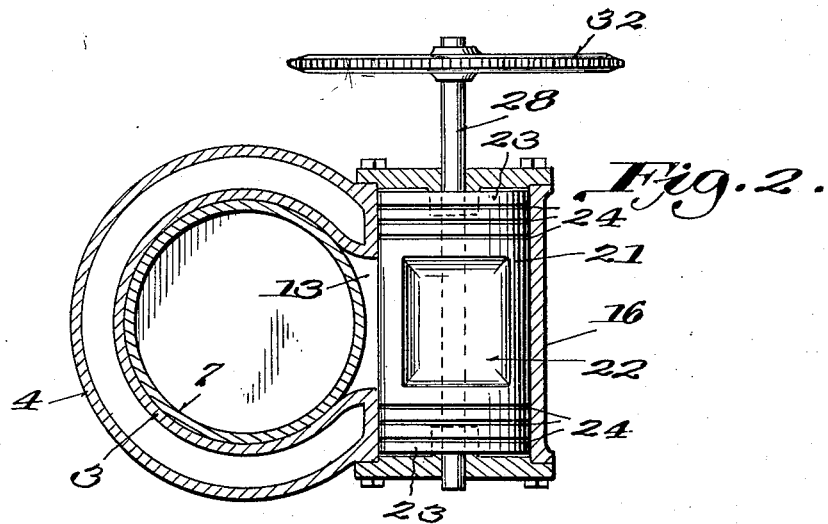
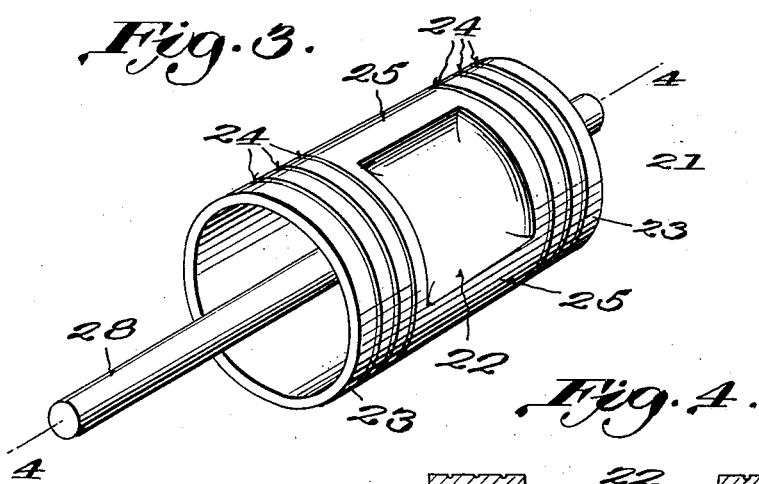
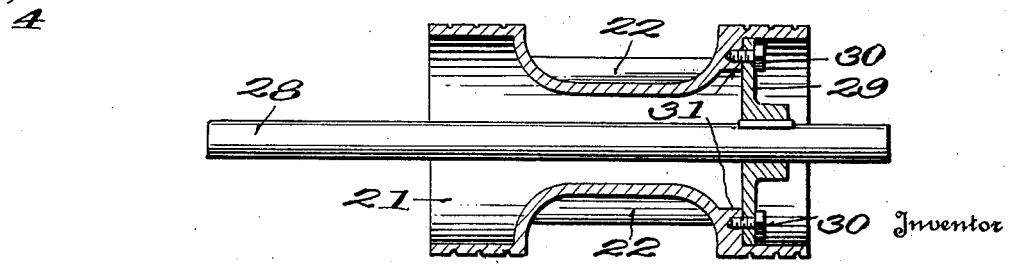

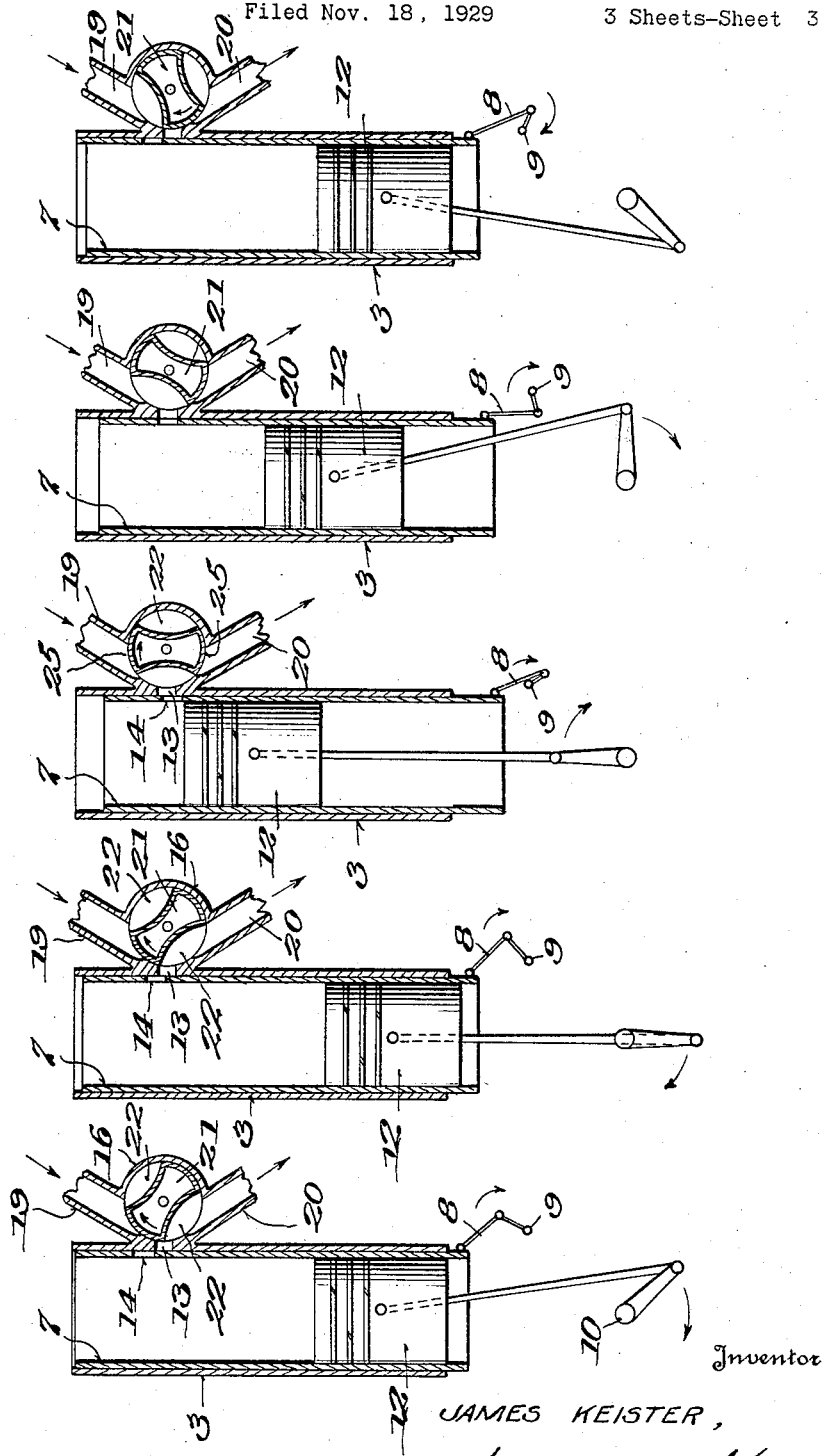

1,902,130

UNITED STATES PATENT OFFICE

JAMES KEISTER, OF STEUBENVILLE, OHIO

INTERNAL COMBUSTION ENGINE

Application filed November 18, 1929. Serial No. 407,989.

The present invention relates broadly to internal combustion engines and more particularly to engines of the general type referred to as Knight or sleeve-valve engines and to certain novel and advantageous valve arrangements in such a type of engine.

At the present time, it is customary to construct internal combustion engines according to either one of two general types or classes, the poppet valve engine and the sleeve valve engine, both having well recognized features of advantage and disadvantage. One of the recognized advantages of the poppet valve engine is the possibility, because of the cam operation of these valves, of properly timing the opening and closing movements of the valves in respect to the piston stroke. For example, the exhaust valve may begin its opening movement shortly before the end of the power stroke and remain open until the end of the next succeeding exhaust stroke of the piston, and the charge inlet valve may open promptly at the beginning of the suction stroke and remain open throughout that stroke and for a short portion of the next succeeding compression stroke of the piston. The importance of these valve portings will later be referred to. The noise, wear and large number of parts required for the poppet valves, together with the comparatively low thermal efficiency, the compression losses, and carbon formation, are all recognized objectionable features of this type of engine.

Recognized advantages of the sleeve-valve type of engine are quietness and smoothness of operation, minimum of wear, comparatively small number of parts for the valves and almost entire absence of harmful carbon. One recognized disadvantage, where two sleeves are employed, one working inside the other, is the difficulty of machining them for their proper smooth fitting and working relation, and their tendency, even when properly machined in the first place, to become warped and distorted from their required smooth working relation, due to the pressure and temperature conditions under which they operate. These particular disadvantages may be substantially avoided by employing a single sleeve valve, instead of two, in association with a properly designed and arranged distributer valve outside the engine cylinder for cooperating with the sleeve valve in the admission of the explosive charge to the engine cylinder and exhaust therefrom. But, so far as I am aware up to the time of my present invention, the prior art arrangements of sleeve-valve means within the cylinder and a cooperating distributer valve have not avoided another disadvantage of the sleeve-valve type of engine, a porting of the valves which does not give the efficiency of engine operation either in the exhausting of the gases or in the drawing in of the explosive charge possible with the poppet-valve type of engine.

In the customary sleeve valve engine of the prior art, the sleeve valve is in a position fully opening the charge intake port to the engine cylinder at the beginning of the suction stroke of the piston and as the piston advances on its suction stroke the sleeve valve moves toward closing position of the charge intake port, the completely closing position being reached when the piston is at the lower dead center of its suction stroke. This does not provide for the greatest possible volume of charge intake into the cylinder because of several factors. One is that at the time of the greatest suction effect of the piston movement, namely at the time of its greatest speed of movement on its down or suction stroke, the sleeve valve has moved somewhat toward closing position of the charge intake port and consequently that port is reduced in capacity for the passage of the charge therethrough into the engine cylinder. Moreover, by the time the piston has neared the lower dead center position of its suction stroke, the sleeve valve has so closely approached its position closing the charge intake that but a slight opening or crack is left, with a consequently greatly reduced capacity for passage of the charge into the cylinder.

Another factor is the resistance to or drag on the advancing movement of the charge toward and into the engine cylinder offered by the charge intake pipe and other conduits, passages and ports which the charge traverses, so that the charge lags behind and does not keep up, so to speak, with the movement of the piston which creates the differential pressure, or as commonly termed suction effect, forcing the charge into the cylinder. Were it not for this resistance to or drag on the charge, and if the advancing movement of the charge responded exactly to the piston movement, the lower dead center of the suction stroke of the piston would present the condition of maximum possible supply of charge to the cylinder, and the proper point of closure of the charge intake port. But with the drag referred to, a substantial additional amount of the explosive charge will enter the cylinder if the charge intake port is left open during the initial upward advance of the piston on the compression stroke, for example during the first thirty degrees of such upward movement, measured in terms of the engine crank-shaft movement. So far as I am aware, the valve arrangements of the sleeve-valve or Knight type of engine heretofore employed do not permit of this porting movement of the valve or valves which control the supply of the charge to the engine cylinder.

Also a general and disadvantageous characteristic of the sleeve valve type of engine of the prior art is the delay in the opening of the exhaust port until the lower dead center of the power stroke of the piston is reached, thus limiting the time of the exhaust to the next 180 degrees of advance of the piston, or to what is generally called its exhaust stroke. It is recognized as better and more efficient engine operation, and is the typical practice in poppet-valve engines, to begin the opening of the exhaust port and the exhausting of waste gases from the engine cylinder, prior to the end of the power stroke, generally about 30 degrees of crank-shaft movement before the end of the power stroke.

Accordingly, a general object of my invention is to provide valve arrangements in a sleeve-valve type of engine avoiding the disadvantages of the valve movements and portings referred to above as characteristic of that type of engine in the prior art and attaining the advantages of the proper timing of the opening and closing movements of the valves referred to above as characteristic of the poppet-valve engine.

Another general object of my invention is to attain these advantages in what, for reasons already given, I have found to be the most desirable and efficient form of a sleeve-valve engine; that is, one having but one sleeve valve within the engine cylinder and a distributer valve outside the engine cylinder cooperating with the sleeve valve to control the charge to the engine cylinder and the exhaust therefrom.

Another and more particular object of my invention is to provide a distributer valve in such a type of engine as last mentioned above, which distributer valve will connect the cylinder intake port with the charge supply pipe of the engine throughout the suction stroke and into the next succeeding compression stroke of the piston and will connect the cylinder exhaust port with the exhaust pipe of the engine prior to the end of the power stroke and continue the same until the end of the exhaust stroke, while closing those connections at all other times of the piston movement.

A further particular object of my invention is the provision of a distributer valve for both the exhaust gases and the charge, of an arrangement of valve and casing walls and ports tending to minimize the heating effect of the exhaust gases on the valve and its casing and keeping it below the limit which would cause distortion of the valve or its casing and sticking of the valve.

Still another particular object of my invention is to provide a rotary distributer valve having the advantageous features and capabilities of operation referred to in the last two preceding paragraphs and which will have a relatively slow movement of rotation for certainty and smoothness of operation and long wear.

The foregoing and other objects and the principles of my invention will more fully appear from the detailed description of a preferred embodiment of the invention hereinafter presented and illustrated in the accompanying drawings forming a part of this specification. It is to be understood, however, that the embodiment referred to is simply one example illustrative of the principles of the invention and is not to be taken as limiting the invention to that precise form, the invention including other embodiments and modifications of the embodiment shown, all within the scope of the appended claims.

In the drawings:

Fig. 1 is a vertical sectional view through an engine constructed according to the present invention;

Fig. 2 is a transverse sectional view on the line 2—2 of Fig. 1, with certain parts of the distributer valve and its operating mechanism partly in elevation and partly broken away;

Fig. 3 is a perspective view of the distributer valve, on a larger scale than the scale of Figs. 1 and 2;

Fig. 4 is a longitudinal sectional view of the distributer valve along the line 4—4 of Fig. 3; and Figs. 5 to 9, inclusive, are diagrammatic sectional views showing the various positions of the valves with respect to the piston positions at different points in the cycle of operation of the engine, and illustrating the operating principles of the invention.

The engine cylinder, cylinder head and piston and its crank shaft connections may be of any usual or preferred construction. Referring more particularly to Fig. 1 of the drawings, an engine constructed in accordance with the present invention may comprise a crank case 2 of any usual or desired construction having supported thereon a cylinder 3 which is preferably surrounded by a cooling jacket 4, as is customary in the art. The cylinder may be, and as shown is, provided with a water-cooled head 5 carrying an ignition device, such as a spark plug 6. As already stated, all of these parts may be of the usual or any desired construction.

My invention contemplates port means for the entry into the cylinder of the explosive charge and exit therefrom of the exhaust gases and sleeve-valve means within the cylinder for opening the port means to the supply of the explosive charge during the whole of the suction stroke and into the compression stroke and for opening the port means to the exhaust pipe shortly prior to the end of the power stroke and therefrom through the exhaust stroke, and also with the sleeve valve means arranged to increase its opening movement during the initial advance of the piston on the suction stroke. Preferably, and as shown in the illustrative embodiment of the invention, the sleeve valve means consists of a single annular valve 7 which is adapted to be reciprocated by a connecting rod 8 pivotally connected to a crank shaft 9, the crank shaft 9 being operated in timed relation with the operation of the engine crank shaft 10 but at half the speed of that crank shaft, by any well known form of operating connection, in the present instance indicated at 11 as a sprocket and chain connection. A piston 12 slidable within the sleeve 7 is connected in the usual manner, as shown in Fig. 1, with the crank shaft 10.

Preferably also, and as shown in the illustrative embodiment of the invention, the port means for entry into the cylinder of the charge and exit therefrom of the exhaust gases, is a single aperture or port, formed through a side wall of the cylinder above the upper limit of the piston stroke, as indicated at 13 in Fig. 1. This feature, although not indispensable to my invention, is a highly desirable feature within the contemplation of the invention, in association with other features thereof, as the heat imparted to the walls of the cylinder port by the exhaust gases is taken up by the incoming charge whereby the latter is effectively heated and vaporized. As will later more fully appear, this same principle is employed and increased advantage attained in the arrangement of the distributer valve outside the cylinder to have each pocket or port of that valve traversed by both the exhaust gases and the explosive charge in succession. Another advantage in the single cylinder port is that, as only one opening is provided through the cylinder walls, high thermal efficiency of engine operation is insured.

One of the important features of my invention is the arrangement of the sleeve valve to effect opening and closing movement of the cylinder port with respect to the piston stroke at the times hereinbefore referred to as contemplated by my invention. This arrangement and its operating effect will more fully appear from the description of operation to be given after all the structural features of the invention have been described. It is now pointed out, however, that, as shown in the illustrative embodiment of the invention, the sleeve valve 7 is provided with a port 14 formed through its wall, and with the port so positioned along the length of the sleeve valve in respect to the cylinder port 13 and the valve movements such as to bring the valve port 14 into and out of registration with the cylinder port 13 at the proper times in the engine cycle. This is illustrated in Figs. 1 and 5 to 9 inclusive. In Fig. 1, which represents the position of the piston and sleeve valve at the beginning of the power stroke, the port 14 of the valve is out of registry with and substantially above the cylinder port 13. In Fig. 5, the piston has moved through the major portion of its power stroke, or about 150 degrees of the power stroke, as given in this particular example, and the valve movement, in downward direction, is such as to place the valve port 14 in position ready to open the cylinder port 13 for the passage of the exhaust gases from the cylinder and through the distributer valve to the exhaust pipe as will hereinafter be more fully pointed out, the valve port 14 remaining in whole or partial registry with the cylinder port through the remainder of the power stroke and the next succeeding exhaust stroke of the piston, as shown in Figs. 6 and 7. Fig. 7 presents the piston at the end of its exhaust stroke and ready to begin its next succeeding intake or suction stroke, and, as will be noted, the sleeve valve is at the bottom of its stroke but with its port 14 in substantial although not complete registration with the cylinder port 13, ready for intake of the charge into the cylinder from the distributer valve as will later be more fully pointed out. On the down or suction stroke of the piston, the sleeve valve begins its upward stroke, and it is particularly to be noted, from a comparison of the positions of the sleeve valve in Figs. 7 and 8, that the continued upward movement of the sleeve valve concurrently with the down or suction stroke of the piston first increases the registration of the valve port 14 with the cylinder port 13, or, otherwise expressed, increases the opening movement by the sleeve valve of the cylinder port 13, and thus increases the charge intake capacity of the cylinder port at the proper time, that is at the time of greatest speed and hence suction effect of the piston stroke. It is also particularly to be noted from the relative positions of the piston and sleeve valve, as shown in Fig. 9, that the sleeve valve does not entirely close the cylinder port for the intake of the charge until the piston has advanced into its compression stroke, the advance of the piston into the compression stroke at the time of the closure of the cylinder port as given in the illustrative example being 30 degrees beyond the lower dead center.

The cylinder port 13 and the sleeve-valve port 14 are preferably, although not necessarily, of substantially the same area and relatively narrow longitudinally of the cylinder but of substantial width transversely thereof, as appears from a comparison of the dimensions of these ports shown in Figs. 1 and 2.

The single cylinder port and sleeve valve arrangement of my invention described above necessitates a distributer valve outside the cylinder to properly direct and control the flow to and from the cylinder port of the charge and the exhaust gases respectively while at the same time permitting the use of a single cylinder port for the passage therethrough of both the charge and the exhaust. More particularly, the distributer valve must also be of such an arrangement and porting movement as to connect the cylinder port alternately with the charge supply pipe and exhaust pipe of the engine precisely at those times when the sleeve valve functions to open the cylinder port for intake and exhaust as heretofore described; and one of the primary objects of my invention has been the provision of such a distributer valve.

A form and arrangement of such a distributer valve which I have found to be operative and especially effective for the functions referred to above are a double ported rotary valve driven in timed relation with the sleeve valve and the engine crank shaft and at one half the speed of the sleeve valve and one fourth the speed of the engine crank shaft.

Referring now more particularly to the rotary distributer valve and its casing employed in the illustrative embodiment of the invention, the valve casing or chamber, indicated generally at 16 in Figs. 1 and 2, is disposed on the engine cylinder wall over the cylinder port 13, and has a smooth cylindrical interior or bore, the port 13 forming a common port for the valve chamber and the cylinder and through which port the valve chamber communicates with the cylinder, all as clearly appears in Fig. 1.

The valve chamber is provided with charge supply and exhaust ports 17 and 18, respectively, extending through the side wall of the bore of the chamber and with these ports disposed approximately equi-distant from and on opposite sides of the cylinder port 13, with all three of these ports lying in the same transverse arc of the bore of the valve chamber, all as shown in Fig. 1. A charge supply pipe 19, or branch pipe from the charge supply manifold of the engine, is connected to the charge inlet port of the valve chamber, and an exhaust pipe 20, or branch to the exhaust manifold of the engine, is connected to the exhaust port 18 of the valve chamber, as also shown in Fig. 1.

The rotary distributer valve, indicated generally by the reference numeral 21 in all the views of the drawings, is made of general cylindrical contour to fit the valve chamber for rotation therein. This valve is preferably of hollow or shell-like form, as shown in Fig. 4, for lightness of weight and consequent ease of operation as well as for ease and economy of manufacture, for example as by casting, the valve surfaces which have rotational engagement with its casing, of course being machined. The valve is cast in form to present two oppositely disposed pockets 22, which function as the passages or ports of the valve, the conformation of these pockets leaving opposite cylindrical head portions 23 preferably having oil grooves 24 for the lubrication of the valve, and curve surfaced side portions 25.

It is particularly to be noted that each of these pockets 22 of the rotary valve are formed by walls curving inwardly from the head portions 23 and the side portions 25, as shown in Figs. 1, 3 and 4, so that every point of each pocket surface is in a curved plane, a feature of considerable practical advantage in the easy and uninterrupted flow of the charge mixture and the exhaust gases along these pockets which function as the passages or ports of the valve, as will presently more fully appear.

The opposite cylindrical head portions 23 of the valve are disposed in the end portions of the valve chamber as shown in Fig. 2. The curved side portions 25 of the valve body move across the cylinder port and the charge supply and exhaust ports of the valve chamber in the rotation of the valve as shown in Figs. 1 and 5 to 9 inclusive. These side portions 25 and the body of the valve between them separate the charge supply port from the exhaust port of the valve chamber in all positions of the valve, and alternately cover and uncover those ports in the rotation of the valve, the uncovering positions as in Figs. 5, 6 and 8, permitting the flow of the charge from the charge supply port of the valve chamber through the port of the rotary valve to the engine cylinder port or the flow of the exhaust gases from the engine cylinder port to the exhaust port of the valve chamber, depending upon the position of the rotary valve as shown in these views.

The length of each pocket or port 22 of the rotary valve between the head portions 23 is made to correspond approximately to the width of the cylinder port 13 transversely of the cylinder, as shown in Fig. 2.

As provision for a direct and short passage of the explosive charge from the charge supply pipe to the cylinder port and of the exhaust gases from the cylinder port to the exhaust pipe through the distributer valve and its casing, the charge supply and exhaust ports 17 and 18, respectively, of that casing, to which the charge supply and exhaust pipes are connected, are disposed, as shown in Fig. 1, on opposite sides of the cylinder port in an arc of the cylindrical bore of the valve chamber which includes the cylinder port and with their nearest points less than 90 degrees apart, or, otherwise expressed, with the nearest points of the charge supply and exhaust ports of the valve chamber less than 45 degrees from the center point of the cylinder port where it opens into the valve chamber. Such an arrangement, by reason of the direct and short passage of the exhaust gases, also has the advantage of reducing to the minimum the heating effect of those gases on the distributer valve and its casing. It is to be understood, of course, that these precise locations and distances apart of the valve chamber ports are not indispensable to the advantages of my invention, but are here given primarily for the purpose of explaining the general principles of the arrangement, and with the explanation given simply by way of a definite concrete example which I have found especially effective in practice.

For the particular structure shown in the drawings, I have also found it preferable to have the width of each of the side portions 25 of the rotary valve body in the plane shown in Fig. 1 such that the arc across that width is approximately equal to the arc of the cylindrical bore of the valve chamber between the nearest points of the charge supply and exhaust ports, and to have the length of each valve pocket or port 22 between the side portions 25, such that the chord subtended by the pocket is slightly greater than the straight-line distance or chord between the closest adjacent points of the charge supply and exhaust ports of the valve casing. Here again these precise dimensions of the parts are not indispensable to my invention but have been found to be especially effective for the particular type of valve construction shown in the drawings in giving the proper opening and closing movements of that valve when driven at one fourth of the speed of the engine crank shaft. One feature of particular advantage in the arrangement just described, and pertaining especially to the length of the valve pocket just referred to, is a slight opening of the charge supply port of the valve chamber by the rotary valve when that valve has reached its position just closing the exhaust pipe. This is shown in Fig. 7 which diagrammatically represents the position of the piston, the sleeve valve within the cylinder and the distributer valve at the end of the exhaust stroke. As there shown, the piston is at its upper dead center at the end of the exhaust stroke, the sleeve valve is in position partially opening the cylinder port on the inner side, and the lower side portion 25 of the distributer valve has just reached the position closing the exhaust port 18 of the valve chamber and thus disposing the upper side portion 25 of the valve in a position to slightly open the charge supply port 17 of the valve chamber, so that upon the beginning of the piston suction stroke passage is already established between the charge supply port of the distributer-valve chamber and the open cylinder port for the immediate flow, under the suction of the piston, of the charge through the distributer valve and its chamber into the engine cylinder.

Another feature of advantage in the construction of distributer valve and its chamber shown in the drawings is the gentle curvature of the chamber walls at the sides of the charge supply and exhaust pipe connections nearest the engine cylinder, as indicated at 26 and 27, respectively, on Fig. 1. The curvature of the side wall of the charge supply pipe connection, being complementary to the curvature of the port 22 of the valve, directs the gaseous mixture of the charge flowing along that wall in a gentle curve inwardly of the valve port 22, when that port is open to charge supply connection of the valve chamber as best shown in Fig. 8, so that such charge enters the valve port smoothly and without substantial shock and more readily and smoothly follows along the sweeping curvature of the valve pocket surfaces into the cylinder port. Likewise, the curvature of the side wall of the exhaust pipe connection, indicated at 27 in Fig. 1, being similar to that of the opposed curved surface of the port 22 of the valve, provides for the flow of the exhaust gases from the port of the valve, when that port is open to the exhaust pipe connection of the valve chamber as best shown in Fig. 6, through the exhaust port and into the connected exhaust pipe 19 smoothly and without substantial shock, thus facilitating and speeding the passage of the exhaust gases and thus consequently further tending to reduce to a minimum the heating effect of the exhaust gases on the distributer valve and its casing.

Any suitable means may be provided for driving the rotary distributer valve at the desired speed of one-fourth of the speed of the engine crank shaft. In the present illustrative embodiment of the invention, when a hollow valve body is employed as shown in Fig. 4, the driving means includes a shaft 28, extending through the hollow central portion of the valve. This shaft is provided with a fixedly attached driving dog 29, which driving dog in turn is attached to the valve body by bolts 30, extending through apertures in the driving dog slightly larger than the shanks of the bolts, the bolts being threaded into the annular shoulder 31 formed on the interior of the valve body, all as shown in Fig. 4. This particular construction is not essential to my invention but is preferably used because it permits a slight relative movement between the rotary valve and its shaft 28, whereby torsional or binding strains of the valve do not affect the operation of the shaft, or vice versa, thus making provision for the performance by the valve of its functions with great smoothness and reliability.

One end of the shaft 28 of the rotary distributer valve is provided with a sprocket 30, as shown in Fig. 2, and by that sprocket and the chain 31, represented diagrammatically in Fig. 1, trained over the sprocket 30 and over a suitable sprocket on the engine crank shaft, the distributer valve is driven in rotary movement at one fourth of the speed of the engine shaft.

The operation of the engine is apparent from the description hereinbefore given and from the following further reference to the positions of the parts as shown in Figs. 1 and 5 to 9 inclusive.

Fig. 1 shows the position of the piston, the sleeve valve within the cylinder and the distributer valve outside the cylinder at the beginning of the power stroke of the piston, with the sleeve valve covering the inner side of the cylinder port 13, and the distributer valve covering the outer side of that port so as to close the connections between that port and the charge supply and exhaust pipe of the engine. When the piston has advanced downwardly to near the end of its power stroke, or through 150 degrees of crank shaft rotation as given in the illustrative example, the sleeve valve has moved downwardly at half the piston speed to dispose its port 14 ready to uncover the inner side of the cylinder port 13, and the distributer valve has rotated through a quarter of the angular movement of the crank shaft to uncover the outer side of the cylinder port and the exhaust port of the valve casing so as to connect the cylinder port with the exhaust pipe, as shown in Fig. 5. From the position in the cycle of operations represented in Fig. 5, on through the completion of the power stroke as shown in Fig. 6 and to the end of the exhaust stroke as shown in Fig. 7, the sleeve valve continues to uncover the inner side of the cylinder port 13, and the distributer valve continues to uncover the outer side of that port and to connect the same, through one of the ports 22 of that valve, with the exhaust pipe. At the end of the exhaust stroke, as shown in Fig. 7, the sleeve valve has completed its downward stroke and still maintains the inlet port open and ready for the passage therethrough of the charge upon the beginning of the next or suction stroke. At the end of the exhaust stroke, the distributer valve has completed but one fourth of its rotation movement and, as shown in Fig. 7, has covered the exhaust pipe connection to the valve casing and has slightly opened, or "cracked", the port of the valve casing to which the charge supply pipe is connected.

During approximately the first half of the suction stroke, the sleeve valve moves upwardly from its position at the beginning of that stroke shown in Fig. 7 to its position shown in Fig. 8 more fully uncovering the inner side of the cylinder port, while the distributer valve has rotated from its position shown in Fig. 7 to the position shown in Fig. 8 further uncovering the charge supply port of the valve casing. As shown by a comparison of Figs. 8 and 9, the cooperative movements of the sleeve valve and distributer valve are such as to continue the opening of the cylinder port to the charge supply pipe through the port 22 of the valve until the piston has advanced through its suction stroke and into the next succeeding compression stroke, the position of the parts on the compression stroke as shown in Fig. 9 marking the shutting off of the cylinder port from the charge supply pipe. At the completion of the compression stroke, which is the same as the beginning of the power stroke as represented in Fig. 1, the piston has made two complete cycles of movement, corresponding to 720 degrees of crank shaft movement, the sleeve valve has made one complete cycle of down and upstroke or 360 degrees of angular movement of its valve shaft, while the distributer valve has made one half turn of 180 degrees.

It is apparent that the rotational movement of the distributer valve at one quarter the speed of the engine crank shaft not only enables the valve to perform the porting operations above described, but also causes each pocket or port 22 of the valve to function as a charge supply and exhaust port in successive order of such functioning, thus presenting the advantages of the heating of the charge by the valve pocket previously traversed by the exhaust gases and the cooling of the valve by the heat absorbed by the charge.

What is claimed is:

1. An internal combustion engine comprising in combination, a cylinder and a reciprocating piston therein, said cylinder having a port above the upper limit of the piston stroke for the passage therethrough of the explosive charge into and exhaust gases from the cylinder, a charge supply pipe and an exhaust pipe for said engine, a sleeve-valve in said cylinder for covering and uncovering said cylinder port and a distributer valve outside said cylinder for connecting said cylinder port alternately with said charge supply pipe and said exhaust pipe, said valves having such an arrangement and driven movement with respect to each other and the crank shaft of the engine that said cylinder port is uncovered by said sleeve valve and is connected with said charge supply pipe by said distributer valve throughout each suction stroke and into each next succeeding compression stroke of said piston.

2. An internal combustion engine as in claim 1, and in which said distributer valve is a double ported rotary valve driven at one fourth the speed of the engine crank shaft.

3. An internal combustion engine as in claim 1, and in which said sleeve valve is a reciprocatory sleeve valve driven at one half the speed of the engine crank shaft and in which said distributer valve is a double ported rotary valve driven at one fourth the speed of the engine crank shaft.

4. An internal combustion engine as in claim 1, and in which said sleeve valve increases its uncovering movement of said cylinder port during the first part of the suction stroke of said piston.

5. An internal combustion engine comprising, in combination, a cylinder and a reciprocating piston therein, said cylinder being provided with a port above the upper limit of the stroke of said piston for the passage therethrough of the explosive charge into and exhaust gases from said cylinder, a sleeve valve in said cylinder for covering and uncovering said port, a charge supply pipe and an exhaust pipe for said engine, a double ported rotary distributer valve for connecting said cylinder port alternately with said charge supply and exhaust pipes, said valves having such an arrangement and driven movement with respect to each other and the crank shaft of said engine as to open said cylinder to said exhaust pipe prior to the end of the power stroke and until the end of the succeeding exhaust stroke of said piston and to open said cylinder to said charge supply pipe throughout the suction stroke and into the next succeeding compression stroke of said piston.

6. An internal combustion engine as in claim 5, and in which said double ported rotary distributer valve is provided with means for driving the same at one fourth the speed of the engine crank shaft.

7. An internal combustion engine as in claim 5, and in which said sleeve valve is a reciprocatory sleeve valve provided with means for driving the same at one half the speed of the engine crank shaft and in which said double ported rotary distributer valve is provided with means for driving the same at one fourth the speed of the engine crank shaft.

8. An internal combustion engine comprising, in combination, a cylinder and a reciprocating piston therein, said cylinder having a port above the upper limit of the piston stroke for the passage therethrough of the explosive charge into and exhaust gases from said cylinder, a charge supply pipe and an exhaust pipe for said engine, a sleeve valve in said cylinder for covering and uncovering said cylinder port and a distributer valve outside said cylinder for connecting said cylinder port alternately with said charge supply pipe and said exhaust pipe, said valves having such arrangement and driven movement with respect to each other and the crank shaft of said engine that said sleeve valve is in a position partially uncovering said cylinder port at the beginning of the suction stroke of said engine and increases its uncovering movement during the descent of said piston on its suction stroke and said distributer valve connects said cylinder port with said charge supply pipe throughout said suction stroke of said piston.

9. In an internal combustion engine, in combination with the engine cylinder and reciprocating piston therein, a valve chamber for a rotary valve adjacent said cylinder, said cylinder and valve chamber having a common port for the passage therethrough of the explosive charge into and exhaust gases from said cylinder, said valve chamber being provided with charge supply and exhaust ports on opposite sides of said common port, a rotary valve for said chamber having a portion separating said charge supply port from said exhaust port in all positions of rotation of said valve and having a valve port adapted in the rotation of said valve to connect said common port alternately with said charge supply and exhaust ports, said valve port having a length in the peripheral path of rotation of said valve slightly greater than the distance between said exhaust and charge supply ports whereby when said valve just closes the connection between said common port and said exhaust port it slightly opens connection between said common port and said charge supply port.

10. In an internal combustion engine, in combination with the engine cylinder and reciprocating piston therein, a valve chamber of smooth cylindrical bore disposed on a side wall of said cylinder, said cylinder and valve chamber having a common port through the side of the bore of said valve chamber and cylinder for the passage through said port of the explosive charge into and exhaust gases from said cylinder, said valve chamber being provided with charge supply and exhaust ports through the side of its bore on opposite sides of said common port, a valve fitting said valve chamber for rotation therein and formed with pockets on opposite sides of its axis of rotation, all points of the surfaces of said pockets being in curved planes and each of said pockets being adapted in the rotation of said valve to connect said common port alternately with said charge supply and exhaust ports, and means for rotating said valve at one fourth the speed of the engine shaft.

11. An internal combustion engine comprising, in combination, a cylinder and a reciprocating piston therein, said cylinder having a port above the upper limit of the piston stroke for the passage therethrough of the explosive charge into and exhaust gases from said cylinder, sleeve-valve means in said cylinder operative to open said port prior to the end of the power stroke and keep said port open through the remainder of the power stroke, the succeeding exhaust and suction strokes and into the compression stroke and then to close said port during each cycle of movement of said piston, a charge supply pipe and an exhaust pipe for said engine and distributor-valve means outside said cylinder for connecting said cylinder port with said charge supply pipe as long as said port is open on the suction and compression strokes and for connecting said cylinder port with said exhaust pipe as long as said port is open on the power and exhaust strokes of said piston.

In testimony whereof I hereunto affix my signature.

JAMES KEISTER.